United States Patent
Baker et al.

Patent Number: 5,724,387
Date of Patent: Mar. 3, 1998

[54] CABLE LOSS SIMULATOR FOR SERIAL DIGITAL SOURCE USING A PASSIVE NETWORK

[75] Inventors: Daniel G. Baker, Aloha; Michael Harris, Portland, both of Oreg.

[73] Assignee: Tektronix, Inc., Wilsonville, Oreg.

[21] Appl. No.: 289,594

[22] Filed: Aug. 12, 1994

[51] Int. Cl.$^6$ ............ H04B 3/46; H04B 17/00; H04Q 1/20

[52] U.S. Cl. .......... 375/224; 375/257; 333/170; 324/610; 324/725

[58] Field of Search ............ 375/224, 257, 375/258; 333/12, 32, 33, 170; 348/192, 180, 181; 379/1, 21, 22, 23; 324/609, 610, 725; 371/48; 364/550

[56] References Cited

U.S. PATENT DOCUMENTS

| | | | |
|---|---|---|---|
| 3,621,480 | 11/1971 | Brownlie | 333/118 |
| 3,652,952 | 3/1972 | Chen | 330/151 |
| 3,701,955 | 10/1972 | Spencer | 333/28 R |
| 3,842,247 | 10/1974 | Anderson | 375/224 |
| 4,996,695 | 2/1991 | Dack et al. | 375/224 |

*Primary Examiner*—Stephen Chin
*Assistant Examiner*—Don Vo
*Attorney, Agent, or Firm*—Francis I. Gray

[57] ABSTRACT

A cable loss simulator for a serial digital signal source adapts a constant resistance, bridged-T passive network to simulate the frequency-loss characteristics of a reference coaxial cable. The cable loss simulator is selectively coupled into the output path of the serial digital signal source to simulate the serial digital signal after transmission through the reference coaxial cable. The cable loss simulator has a resistive input section for impedance matching with the serial digital signal source and a bridged-T section with multiple breakpoints to simulate the frequency-loss characteristic of the reference coaxial cable.

1 Claim, 2 Drawing Sheets

CABLE LOSS SIMULATOR FOR SERIAL DIGITAL SOURCE USING A PASSIVE NETWORK

BACKGROUND OF THE INVENTION

The present invention relates to serial digital sources, and more particularly to a cable loss simulator for a serial digital video signal source using a constant resistance, bridged-T passive network to simulate frequency dependent cable loss.

Portable, handheld serial digital test sources are valuable tools for testing serial digital receivers. For the case of serial digital video, which is routed through a transmission line or coaxial cable, the typical receiver connected to this cable uses an equalizer circuit to compensate for the signal distortion caused by the frequency dependent cable loss. To fully test these receivers the serial digital video test source should have the capability of creating an output signal that simulates the signal passage through a typical length of lossy coaxial cable. The bandwidth of these signals typically exceeds 300 Mhz, thereby eliminating conventional signal synthesis methods for generating an adequate waveform. One known method for testing receivers is to connect a cable loss simulation network to the output of the serial digital video test source, the simulation network having a frequency independent impedance and frequency dependent loss characteristic equivalent to that of a typical coaxial cable used for signal distribution. The output from this network then is very nearly the same as if the serial digital signal had passed through the actual distribution cable, and the operation of the receiver's cable loss equalizer may be fully tested.

Prior methods for cable loss simulation have used large spools of the actual cable of the type and length to be simulated, or a somewhat shorter length of a significantly more lossy and physically smaller cable type, in order to simulate the loss and impedance characteristics of long lengths of the typical distribution cable. This typical distribution cable is most often a high quality, low-loss type ranging in lengths from 25 to 400 meters. Therefore large, bulky rolls of cable are needed even when using the physically small, high-loss cable types to simulate lengths of typical distribution cable of over a few tens of meters.

Since it often is desired that the connected system of the serial digital test source and the cable loss simulator be carried to various points in the serial digital video distribution system, a small, passive handheld alternative is needed. In particular the development of small, portable handheld serial digital test sources has dictated a need for an integrated cable loss simulator that may be switched into the output signal path to simulate the constant impedance cable loss to create a suitable signal for practical testing of serial digital receivers in remote locations. Althought there are known applications of passive, constant resistance, bridged-T networks for relatively low frequency or baseband video frequency response weighting, there are no known extensions of the topology or design methods that could be used to simulate a coaxial cable's frequency independent impedance and frequency dependent loss characteristics. More particularly there is no known systematic method to determine the number of passive circuit elements to adequately match the frequency dependent loss curve and to characterize those elements so as to maintain the desired constant resistance over the relatively high, 300 MHz frequency range.

SUMMARY OF THE INVENTION

Accordingly the present invention provides a cable loss simulator for a serial digital source that uses a constant resistance, bridged-T passive network to simulate frequency dependent cable loss. The cable loss simulator is switched into the output path from the serial digital source to simulate a standard length of a specified coaxial cable. The simulator has an input section and a bridged-T section with multiple breakpoints.

The objects, advantages and other novel features of the present invention are apparent from the following detailed description when read in conjunction with the appended claims and attached drawing.

DESCRIPTION OF THE PREFERRED EMBODIMENT

Figure 1:
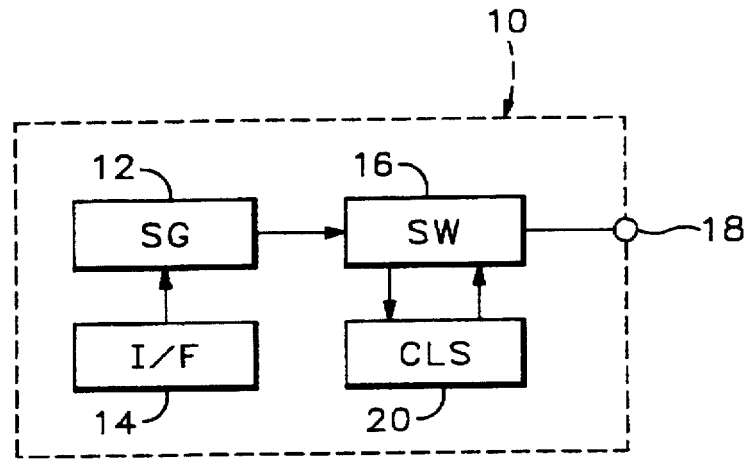
FIG. 1 is a block diagram of a serial digital signal source having a cable loss simulator according to the present invention.

Referring now to FIG. 1 a serial digital signal source 10 includes a serial digital signal generator 12 that produces a predetermined serial digital signal as determined by an operator via an operator interface 14. The serial digital signal is input to a switch 16 that couples the serial digital signal either to an output port 18 directly or to the output port via a cable loss simulator 20.

Figure 2:
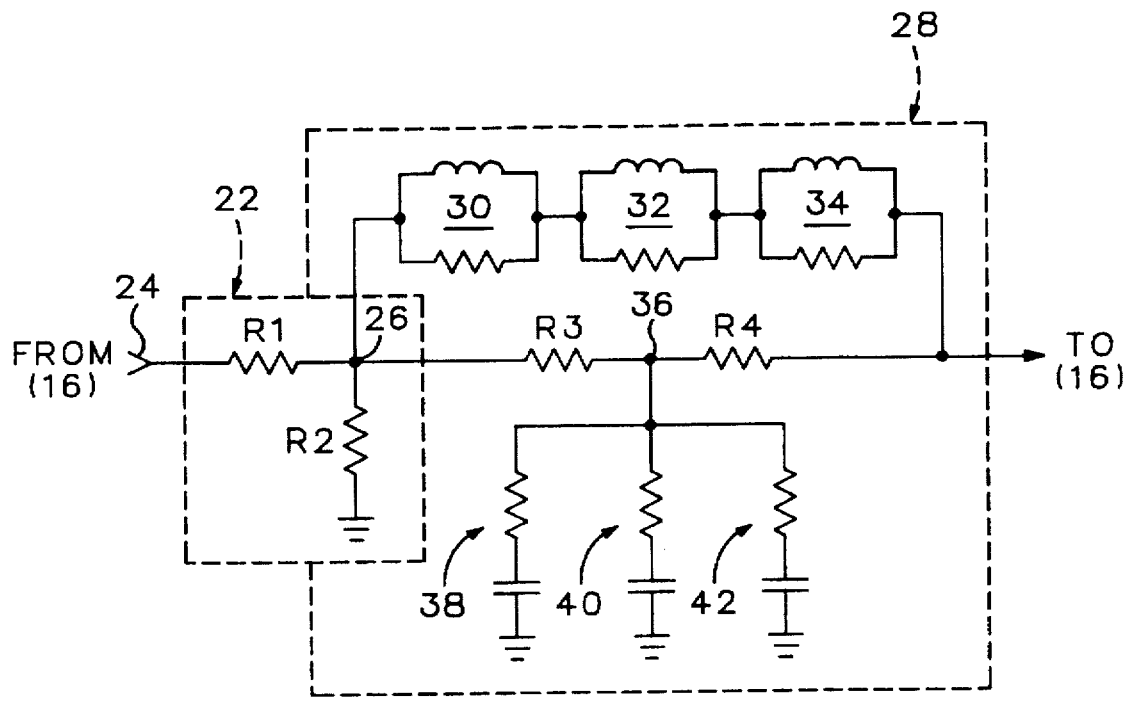
FIG. 2 is a schematic diagram of the cable loss simulator according to the present invention.

As shown in FIG. 2 the cable loss simulator 20 has an input section 22 in the form of a resistive L-section for matching the very low frequency or DC loss of the cable and for maintaining a reasonable cable characteristic impedance match. The serial digital signal is applied by the switch 16 at an input terminal 24 to which is coupled in series resistors R1 and R2. The junction 26 between the two resistors R1, R2 is coupled to the input of a bridged-T section 28 of the cable simulator 20. The output from the bridged-T section 28 is coupled via the switch 16 to the output port 18. A pair of resistors R3, R4, the values of which are equal and set to the characteristic impedance of the simulated cable, are coupled in series between the input and output of the bridged-T section 28. In parallel with the resistors R3, R4 are a plurality of parallel RL circuits 30, 32, 34 in series. To the junction 36 between resistors R3, R4 are coupled in parallel a corresponding plurality of series RC circuits 38, 40, 42. Each corresponding set of RL and RC circuits define a breakpoint for the bridged-T section 28.

Figure 3:
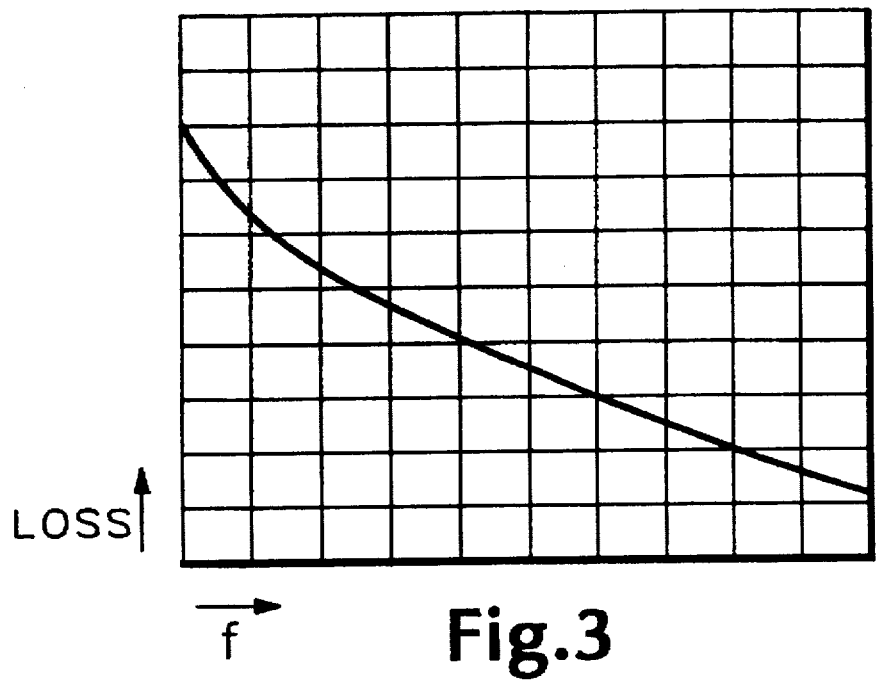
FIG. 3 is a graphic diagram of loss versus frequency for a standard serial digital distribution cable.

The values for the components in the bridged-T section 28, in particular bridge sections 30, 32, 34 and shunt sections 38, 40, 42, are chosen to provide a specified constant resistive impedance matching the characteristic impedance of the simulated cable over a given frequency range, such as DC to 300 MHz. A reference cable, such as 50 meters of a Belden 8281, 75 ohm coaxial cable, manufactured by Cooper Industries, Belden Division, of Richmond, Ind., has a certain loss versus frequency characteristic, as shown in FIG. 3. To match the standard coaxial cable the cable loss simulator 20 is characterized as a constant impedance network with, in this particular embodiment, three breakpoints. The values in the network are selected using computer simulations to match the DC and frequency attenuation characteristics of the standard coaxial cable.

Figure 4:
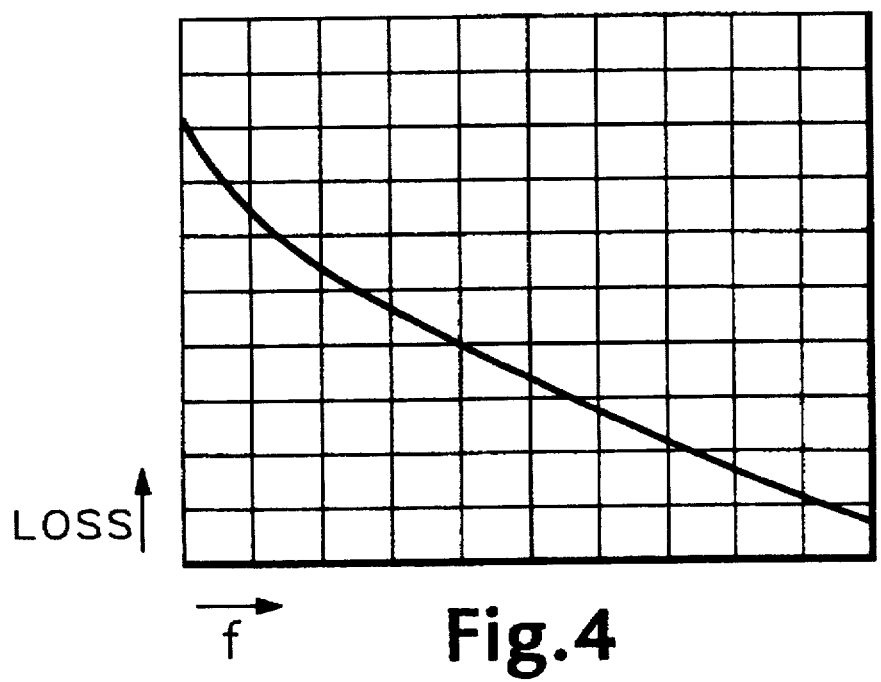
FIG. 4 is a graphic diagram of loss versus frequency for the cable loss simulator according to the present invention corresponding to the standard serial digital distribution cable of FIG. 3.

The constant, or frequency independent, resistance characteristic is obtained by adjusting the values of the components such that the impedance of the RL bridge sections 30, 32, 34 and the admittance of the RC shunt sections 38, 40, 42 change in an identical or corresponding manner. Then when terminated in a resistance equal to R3 and R4, the input resistance of the network is constant. For example consider the oversimplified network of a single RL bridge section and a single RC shunt section. At very low frequencies the RC shunt section is an open circuit and the RL bridge section is a shorted circuit. The input resistance is then equal to the termination resistance at low frequencies. At very high frequencies the inductor of the RL bridge section is an open circuit and the capacitor of the RC shunt section is a short circuit. The resulting resistive network constitutes a bridged-T resistive attenuator and, if the product of the resistor values in the RC shunt and RL bridge sections are equal to the square of the termination resistance and R3 and R4 are equal to the termination resistance, the input resistance is equal to the termination resistance. Further if the RL ratio of the bridge section matches the RC product of the shunt section and simultaneously if the square root of the LC ratio, R3 and R4 are equal to the termination resistance, the input resistance is constant with frequency. In this manner the network may be extended to more sections and these relationships between corresponding sections used to maintain a constant resistance at the input of the network. The parasitic impedances need to be taken into account in adjusting the element values for proper operation at high frequencies in order to match the desired cable length and type. Empirical methods are used to determine the number of sections and time constants to obtain the desired transmission to adequately match the frequency dependent cable loss shape for serial digital systems. In this way the serial digital signal source simulates at the input to a receiving device under test, as shown in FIG. 4, a signal that has been transmitted over such a coaxial cable to determine the receiving device's characteristics.

Thus the present invention provides a cable loss simulator for a serial digital signal source by adapting a constant resistance, bridged-T passive network to simulate frequency dependent cable loss.

What is claimed is:

1. A serial digital signal source comprising:

means for generating a predetermined serial digital signal;

a cable loss simulator having a constant resistance passive network for simulating a frequency dependent cable loss for a reference cable; and means for selectively coupling the predetermined serial digital signal through the cable loss simulator to an output terminal of the serial digital signal source, the cable loss simulator including a resistive L-section having the predetermined serial digital signal applied at an input by the selectively coupling means and a bridged T-section coupled between an output of the resistive input L-section and the output terminal via the selectively coupling means, the bridged T-section having a plurality of breakpoints to simulate a frequency-loss characteristic for the reference cable.

* * * * *